United States Patent
Tawara et al.

(10) Patent No.: US 6,457,963 B1
(45) Date of Patent: Oct. 1, 2002

(54) RESIN-SEALING APPARATUS

(75) Inventors: Masato Tawara, Tokyo; Toshiyuki Ebara, Saitama; Kazuhiko Hatakawa; Sadayuki Ito, both of Kanagawa, all of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/634,635

(22) Filed: Aug. 8, 2000

(30) Foreign Application Priority Data

Aug. 9, 1999 (JP) .......................................... 11-225525

(51) Int. Cl.[7] .............................................. B29C 70/72
(52) U.S. Cl. .............................. 425/129.1; 264/272.17; 425/544; 425/116
(58) Field of Search ................................ 425/116, 544, 425/129.1; 264/272.15, 272.17; 438/127

(56) References Cited

U.S. PATENT DOCUMENTS

| | | | |
|---|---|---|---|
| 2,738,551 A | * 3/1956 | Howald | |
| 4,347,211 A | * 8/1982 | Bandoh | 425/544 |
| 4,599,062 A | * 7/1986 | Konishi | 425/116 |
| 5,200,366 A | * 4/1993 | Yamada et al. | 264/272.17 |
| 5,204,127 A | * 4/1993 | Prusha | 425/544 |
| 5,753,164 A | * 5/1998 | Ritchie et al. | 425/544 |
| 5,863,485 A | * 1/1999 | Groleau | 425/588 |
| 6,081,997 A | * 7/2000 | Chia et al. | 264/272.17 |

FOREIGN PATENT DOCUMENTS

| | | | |
|---|---|---|---|
| JP | 59-222326 | | 12/1984 |
| JP | 03-051111 | | 3/1991 |
| JP | 6-198689 A | * | 7/1994 |
| JP | 11-176855 | | 7/1999 |
| JP | 11-191563 | | 7/1999 |
| JP | 2000-158493 A | * | 6/2000 |

OTHER PUBLICATIONS

Austrian Search Report, dated Apr. 2, 2002.

* cited by examiner

Primary Examiner—Robert Davis
(74) Attorney, Agent, or Firm—Rader, Fishman, & Grauer, PLLC; Ronald P. Kananen, Esq.

(57) ABSTRACT

The invention provides a resin-sealing apparatus that is operated with a low pressure and with a low clamping force without void generation and that is favorable for shortening the molding time and reduction of sealing resin consumption. In the resin-sealing apparatus of the present invention, a resin injection inlet of a pot has an opening at the center of the cavity surface of a cavity of a bottom mold that is a component of a mold unit, and a plunger for injecting molten resin in the pot from the opposite side to the resin injection inlet side is provided slidably and airtightly with the inside wall of the pot.

5 Claims, 4 Drawing Sheets

RESIN-SEALING APPARATUS

BACKGROUND OF THE INVENTION

1. Field of the Invention

This invention relates to a resin-sealing apparatus for sealing electronic parts such as semiconductor elements with resin.

2. Description of the Prior Art

Heretofore, for example, in the case that electronic parts such as highly integrated semiconductor elements are resin-sealed, an apparatus that is operated as described herein under has been used. In detail, electronic parts are placed at the predetermined position in a plurality of cavities formed in a mold unit comprising a movable top mold and a fixed bottom mold, resin tablets are melted in a common pot, the molten resin is extruded and injected by a plunger into the cavities through runners and gates that communicate to the pot to thereby cover and seal the electronic parts in the predetermined configuration with resin.

In the case of a resin-sealing apparatus having the structure as described hereinabove, because the cull is inevitably formed in the pot and runners, sealing resin that is trapped in the runners and call is wasted.

To improve such a resin-sealing apparatus, the inventors of the present invention proposed a resin-sealing apparatus disclosed in Japanese Published Unexamined Patent Application No. Hei 10-119082. In detail, the resin-sealing apparatus has cavities between a movable top mold and a fixed bottom mold into which sealing resin is injected for molding and the molded products are ejected out by means of an ejector pin, wherein sealing resin is inserted into an ejector guide passage of the ejector pin and heated and molten sealing resin is injected into the cavities by means of the ejector pin.

However, in the case of the resin-sealing apparatus of this type, because resin is injected into the cavities by means of the ejector guide passage and the ejector pin, the resin-sealing apparatus is disadvantageous in that (1) the durability of the mold unit becomes poor and the maintenance cost becomes high, (2) an ejector pin cannot be slid smoothly in an ejector guide passage if the thickness of the ejector pin is not thin to some degree, (3) a high pressure and a long injection time are required to inject molten resin into the cavities if the thickness of an ejector pin is thin, (4) molten resin penetrates into a gap between the ejector pin and the ejector guide passage and the ejector pin cannot be moved when the penetrated resin hardens, (5) molten resin flows into the cavities not smoothly because the ejector guide has its opening on the peripheral portion of the cavity surface and not always around the central portion of the cavity surface to thereby generate voids, and (6) injection speed of sealing resin cannot be controlled.

OBJECTS AND SUMMARY OF THE INVENTION

The present invention has been accomplished to solve the above-mentioned problems, it is the object of the present invention to provide a resin-sealing apparatus that is operated with a low pressure and a low clamping force and that is capable of shortening molding time, reducing required resin quantity, and molding without void.

According to one example of the present invention, a resin-sealing apparatus in which a resin injection inlet of a pot opens directly to a cavity of a mold unit and a plunger for injecting molten resin in the pot in to the cavity is disposed slidably and airtightly with the inside wall of the pot is provided.

According to another example of the present invention, a resin-sealing apparatus in which a plurality of cavities are formed on the mold unit, a resin injection inlet of the pot is opens to each cavity, and a pair of a pot and a plunger are disposed for each cavity is provided.

According to further another example of the present invention, a resin-sealing apparatus in which a resin injection inlet of the pot opens to the cavity surface center of the cavity of the mold unit is provided.

According to yet another example of the present invention, a resin-sealing apparatus having a pushing speed controller for controlling the pushing speed of the plunger for injecting molten resin into the cavity is provided.

Therefore, according to one example, the opening of the resin injection inlet of the pot can be formed large up to the range allowable for the area of the cavity surface, and as the result because resin in the shape of thin tablet having a large diameter that is favorable for melting resin can be used, the resin is melted at a low pressure, the melting time is shortened, and the charging speed can be faster.

Because the opening of the resin injection inlet is wide, molten resin is injected into the cavity smoothly, and because resin is charged with a low pressure, a low clamping force for clamping the top mold and the bottom mold is sufficient for molding.

According to another example, a plurality of target products to be molded are resin-sealed simultaneously.

According to further another example, molten resin is injected from the center of the cavity surface, the injected molten resin flows from the center toward periphery, air trapped in the cavity is excluded from the cavity, and thus void generation is prevented.

According to yet another example, the pushing force and pushing speed of the plunger are controlled finely depending on the cavity volume, the size of a target product to be sealed, and type of sealing resin.

BRIEF DESCRIPTION OF THE DRAWING

FIG. 5A is a plan view and FIG. 5B is a side view of this resin-sealing apparatus.

DETAILED DESCRIPTION OF THE PREFERRED EMBODIMENTS

A resin-sealing apparatus of a preferred embodiment of the present invention will be described in detail hereinafter with reference to FIG. 1 to FIG. 5.

Figure 1:
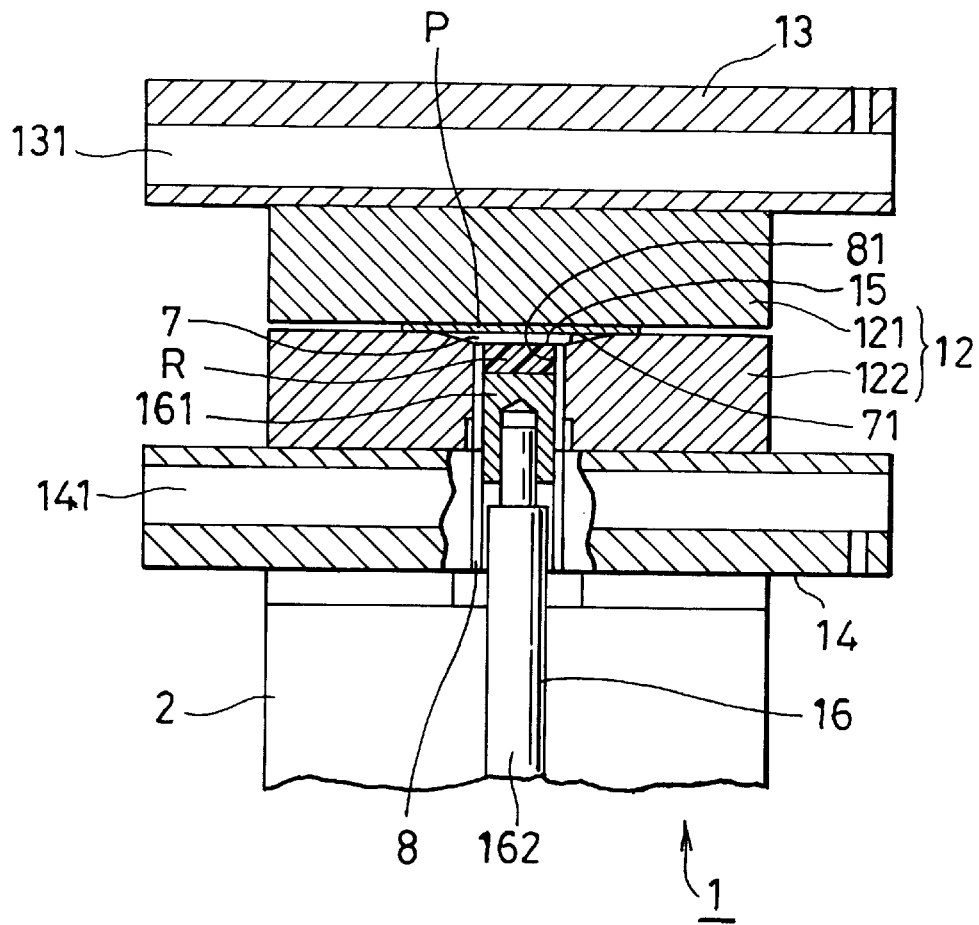
FIG. 1 is a partial cross sectional view of a resin-sealing apparatus in accordance with one embodiment of the present invention.
Figure 2:
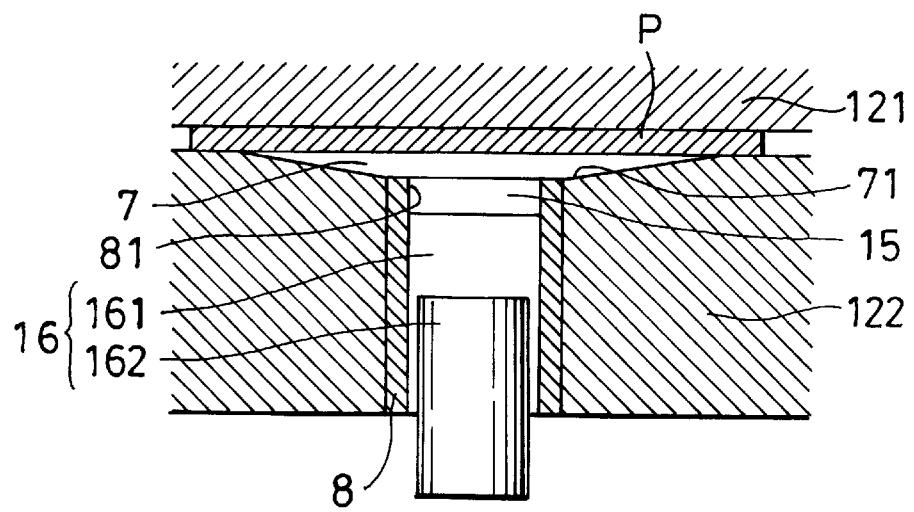
FIG. 2 is a partially enlarged cross sectional view of the resin-sealing apparatus shown in FIG. 1.
Figure 3:
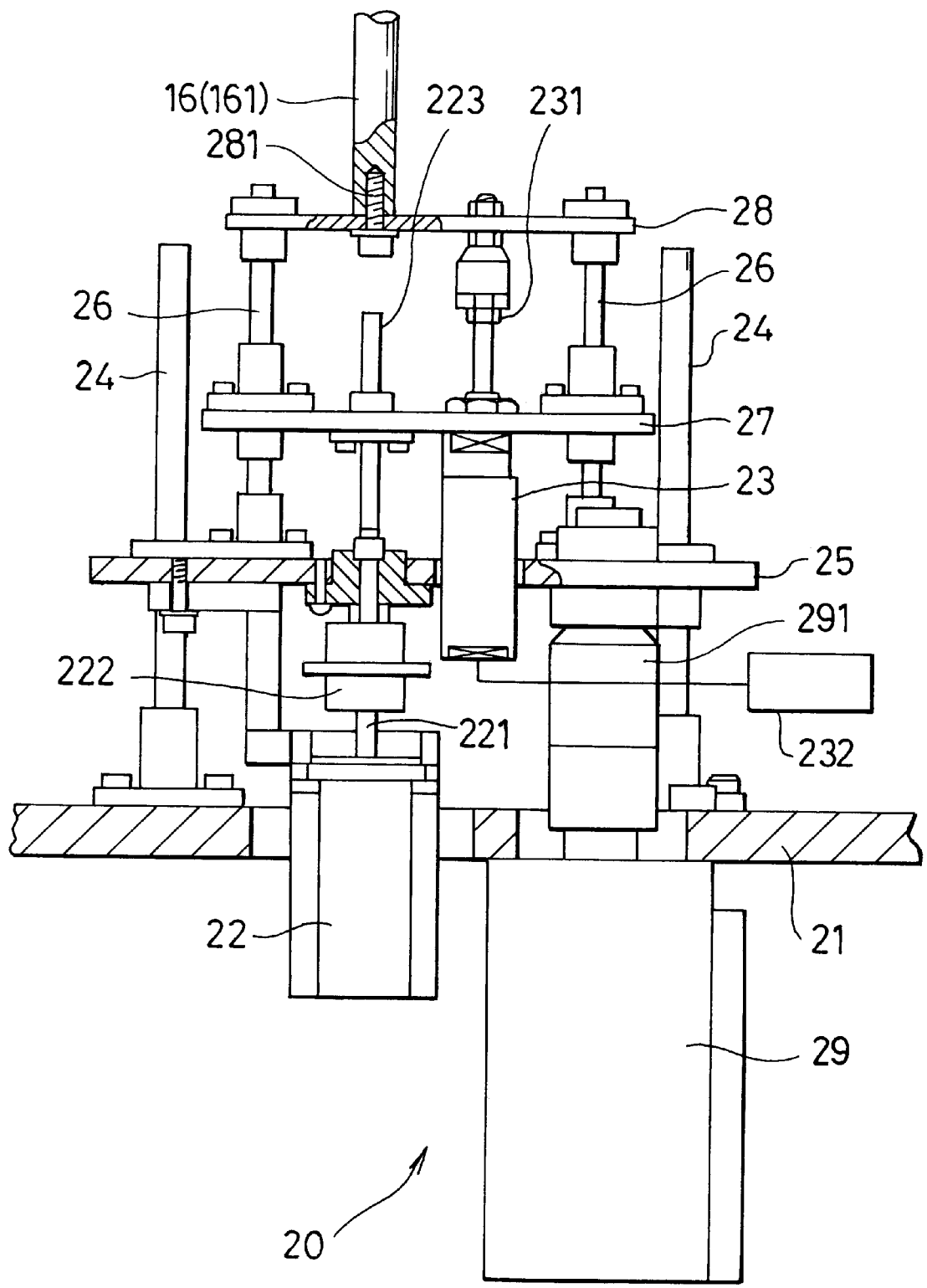
FIG. 3 is another partially enlarged cross sectional view of the resin-sealing apparatus shown in FIG. 1.
Figure 4:
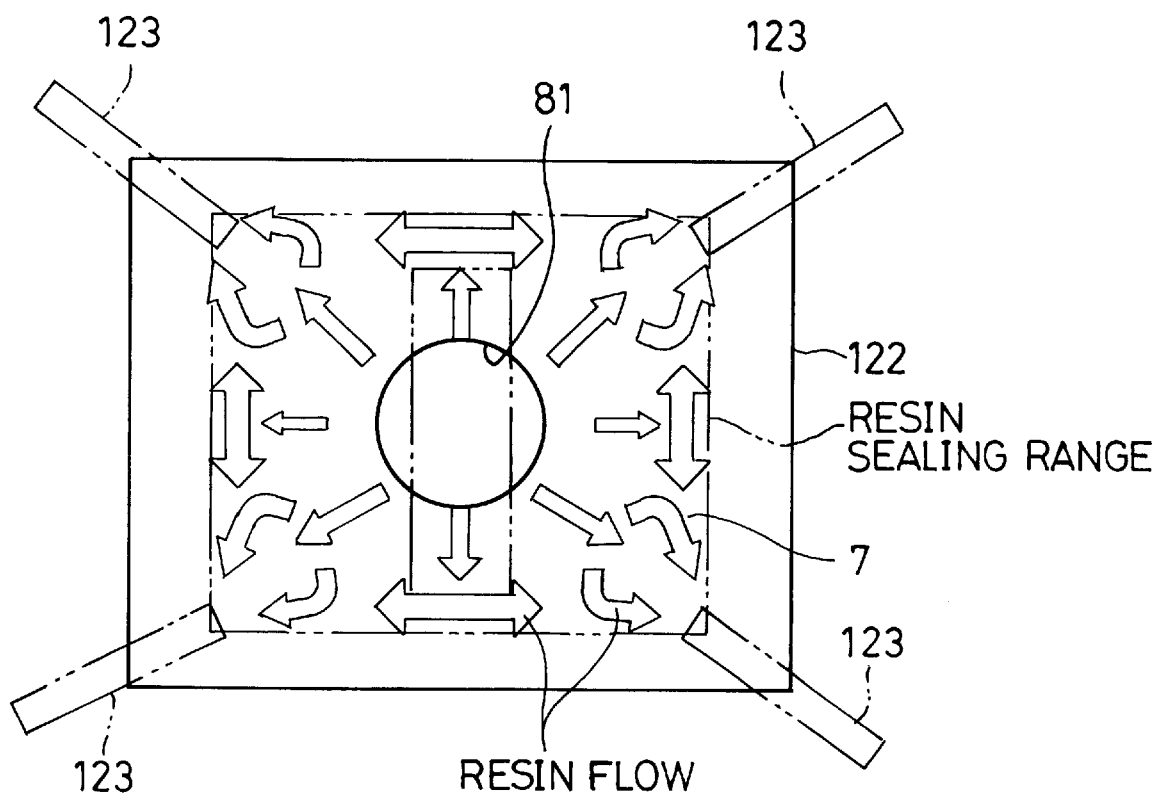
FIG. 4 is a plan view of a cavity area for describing the flow of molten resin in a cavity of a mold unit observed when the molten resin is injected by means of the resin-sealing apparatus shown in FIG. 1.
Figure 5A:
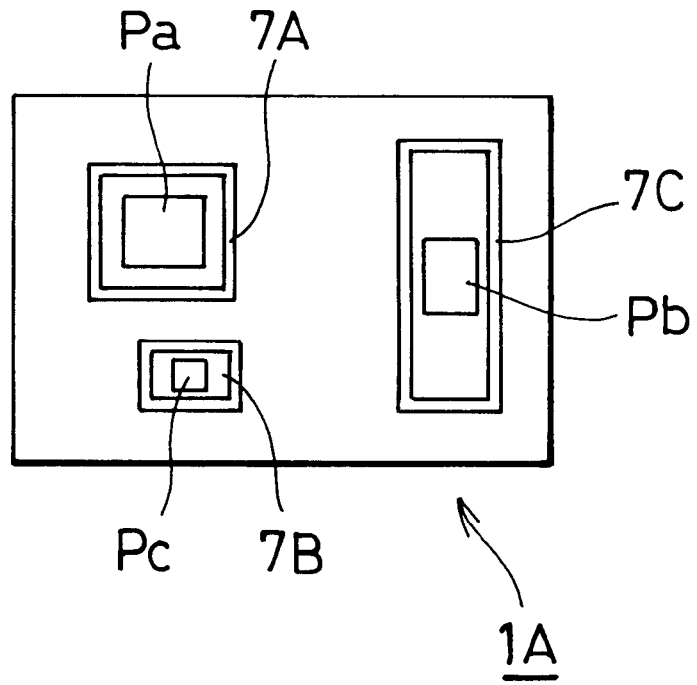
FIG. 5A and FIG. 5B show a mold unit of a resin-sealing apparatus in accordance with another embodiment of the present invention.
Figure 5B:
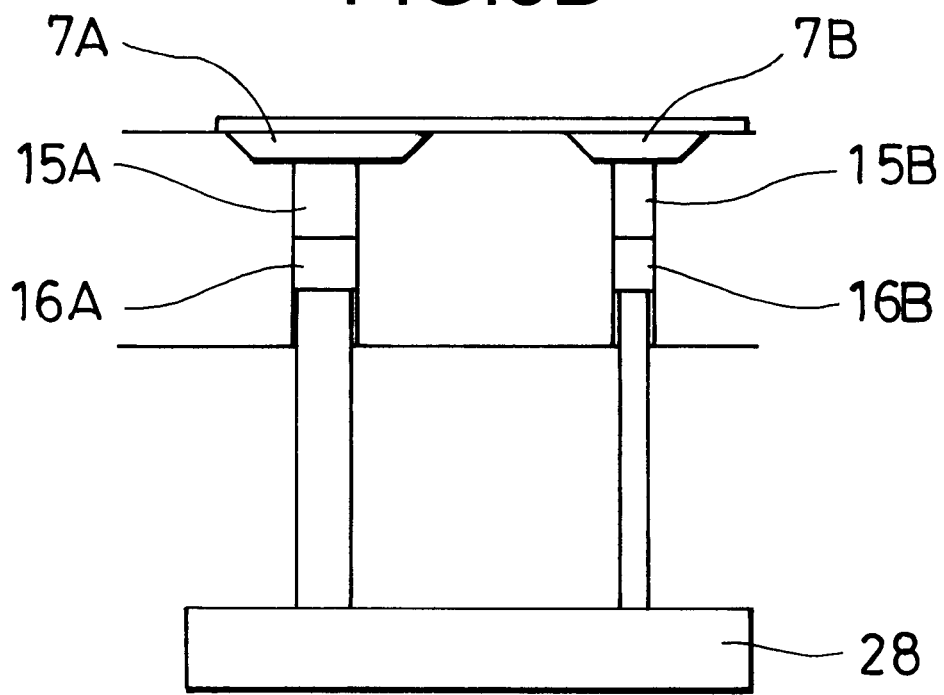

FIG. 1 is a partial cross sectional view of the resin-sealing apparatus of an embodiment of the present invention, FIG. 2 is a partially enlarged cross sectional view of the resin-sealing apparatus shown in FIG. 1, FIG. 3 is another partially enlarged cross sectional view of the resin-sealing apparatus shown in FIG. 1, FIG. 4 is a plan view of the cavity portion for describing the flow of resin in a cavity of a mold unit observed when molten resin is injected by means of the resin-sealing apparatus shown in FIG. 1, and FIG. 5 shows a mold unit of a resin-sealing apparatus in accordance with another embodiment of the present invention, wherein FIG. 5A is the plan view and FIG. 5B is the side view.

At first, the structure and components of the resin-sealing apparatus of the present invention will be described with reference to FIG. 1 to FIG. 4.

In FIG. 1, character 1 denotes the whole resin-sealing apparatus of the present invention. The resin-sealing apparatus 1 comprises a mold unit 12, heater plates 13 and 14, a pot 15, a plunger 16, and a table 2.

The mold unit 12 comprises a top mold 121 and the bottom mold 122, and in FIG. 1 the heater plates 13 and 14 are disposed on the top mold 121 and under the bottom mold 122 respectively. Heaters are incorporated in holes 131 and 141 of the respective heater plates 13 and 14, but not shown in FIG. 1.

Between the top mold 121 and bottom mold 122, in the exemplary case shown in the drawing, a cavity 7 that is served for sealing a target product P, for example, an electronic parts with resin in a predetermined configuration to form a package is formed on the inside surface of the bottom mold 122 disposed with facing to the inside surface of the top mold 121.

A through hole having an opening at the center of the inside surface (referred to as "cavity surface" hereinafter) 71 of the bottom mold 122 is formed on the bottom mold 122 as shown in the enlarged view of FIG. 2, and another through hole having the same diameter as that of the above-mentioned through hole is formed on the above-mentioned heater plate 14, and a common hollow bush 8 is inserted into these holes along the inside peripheral surface. The cavity side opening of the bush 8 is served as the resin injection inlet 81, and the upper portion of the bush 8 is served as the pot 15 for melting sealing resin R.

A plunger 16 is provided in the bush 8 slidably and airtightly at least with the inside wall of the pot 15, which is served for injecting molten resin R in the pot 15 into the cavity 71 from the opposite side to the resin injection inlet 81 side of the cavity 7.

The plunger 16 comprises a plunger rod 161 and a sleeve 162 having the diameter same as the inside diameter of the bush 8 that is screwed to the top end of the plunger rod 161.

The plunger 16 is pushed with a force and speed that are controlled by a pushing force controller 20 having a mechanism as shown in FIG. 3. In detail, the pushing force controller 20 mainly comprises a motor 22 for controlling the speed of vertical motion of the plunger 16 and an air cylinder 23 for pushing the plunger 16 with a constant pushing force.

A plurality of first guide posts 24 are provided vertically with a predetermined interval on the top surface of the frame 21, and a first movable plate 25 is attached to these first guide posts 24 so as to be movable vertically with guiding by the first guide posts 24.

The air cylinder 23 is fixed to the first movable plate 25. Furthermore, on the top surface of the first movable plate 25, a plurality of second guide posts 26 are provided vertically with a predetermined interval, and a second movable plate 27 is attached to the second guide posts 26 so as to be movable vertically with guiding by the second guide posts 26.

The first guide posts 24 are disposed in parallel to the second guide posts 26, and the first movable plate 25 are disposed in parallel to the second movable plate 27.

A third movable plate 28 is attached to the second guide posts 26 in parallel to the second movable plate 27 slidable vertically.

The motor 22 is fixed to the first movable plate 25, and the air cylinder 23 is fixed to the second movable plate 27.

A ball screw 223 is connected to the rotation shaft 221 of the motor 22 with interposition of a coupling 222. The ball screw 223 is attached to the second movable plate 27, and that is a member for moving the second movable plate 27 in the vertical direction. Furthermore, the top end of the rod 231 of the air cylinder 23 is fixed to the third movable plate 28. An air accumulator 232 is connected to the air cylinder 23. The bottom end of the plunger 16 is fixed to the third movable plate 28 with a screw 281.

In FIG. 3, character 29 denotes another air cylinder, which is fixed on the bottom surface of the frame 21, and the top end of the plunger 291 of which is fixed to the first movable plate 25. The air cylinder 29 is an air cylinder for setting the plunger 16, and in other words it is served for moving down the plunger 16 to the place under the table 2 to ease attaching/detaching work of the mold unit 12. This air cylinder 29 does not relate directly to the present invention, and detailed description is omitted.

Next, the operation of the resin-sealing apparatus 1 of the present invention having the structure described hereinabove will be described.

At first, the top mold 121 is moved upward to open the mold unit 12 and to move down the plunger 16, a predetermined quantity of at least one of resin tablets and power resin R is charged in the pot 15 when the pot 15 is formed, the top mold 121 is moved down and clamped to the bottom mold 122, the both heaters 13 and 14 are activated to heat the top mold 121 and the bottom mold 122 at a predetermined temperature and also to heat the pot 15 for heating sealing resin R. When sealing resin R is melted at the predetermined temperature, the air cylinder 23 is operated to move up the plunger 16 at a constant pressure and lifting speed as described hereinafter.

The top end of the plunger 16 extrudes, injects, and charges the molten resin R in the pot 15 from the resin injection outlet 81 into the cavity 7. After the charged sealing resin R hardens, the mold unit 12 is opened, and the target product P such as packaged electronic parts is taken out.

The plunger 16 pushes the molten resin with a predetermined pushing force and with a predetermined pushing speed.

At first, to push out the molten resin R in the pot 15, the pressure of the air cylinder 23 is controlled by use of the air accumulator 232 so that the molten resin is pushed out with a pushing pressure that matches with the quantity and viscosity of sealing resin that are known previously, the projection length of the rod 231 of the air cylinder is controlled, and the vertical position of the third movable plate 28 is controlled.

Next, the pushing speed of the plunger 16 is set by controlling the rotation speed of the motor 22 and by controlling the rotation speed of the ball screw 223. By rotating the ball screw 223 at a constant speed, the second movable plate 27 is moved vertically at a predetermined speed, and the third movable plate 28 to which the rod 231 of the air cylinder 23 is fixed can be moved vertically at the above-mentioned predetermined speed, as the result the plunger 16 can be moved vertically at a predetermined speed.

The operation as described hereinabove is repeated to obtain molded products of desired number.

When molten resin R is injected into the cavity by use of the resin-sealing apparatus 1 of the present invention as described hereinabove, the molten resin flows from the resin injection outlet 81 formed at the center of the cavity 7 to the periphery of the cavity 7 evenly, and finally flows to vent grooves formed at the four corners. Thereby, void or short between wires, in the case that the target product (electronic parts) is an IC chip, is prevented.

A resin-sealing apparatus 1A in accordance with another embodiment of the present invention is shown in FIG. 5A and FIG. 5B. In the case of this resin-sealing apparatus 1A, a plurality of cavities 7A, 7B, 7C, . . . are formed on one mold unit 12A, pots 15A, 15B, 15C, . . . are formed at the positions just under these cavities 7A, 7B, 7C, . . . respectively so that resin injection inlets are positioned at the centers of the respective cavity surfaces, and plungers 16A, 16B, 16C, . . . are disposed on the backside of the respective pots 15A, 15B, 15C, . . .

Furthermore as shown in the drawing, the size of the cavities 7A, 7B, 7C, . . . may be different each other depending on target products Pa, Pb, and Pc. In the case that the mold unit 12A having the structure as described hereinabove is used, a pushing force controller, in which the plungers 16 are connected to the third movable plate 28 of the pushing force controller 20 shown in FIG. 3 at the respective positions correspondingly to the position and the number of the cavities 7A, 7B, 7C, . . . and the pots 15A, 15B, 15C . . . , may be used.

The resin-sealing apparatus 1A of the present invention is used for resin molding with proper and optimal quantity of resin R by structuring the resin-sealing apparatus as described hereinabove, and the same effect as obtained by the resin-sealing apparatus 1 in accordance with the above-mentioned first embodiment is obtained.

As obvious from the above-mentioned description, the resin-sealing apparatus of the present invention can eliminate cull, runner, and gate that are found in the case of the conventional resin-sealing apparatus, and required quantity of sealing resin is reduced. Additionally, because the opening of the resin injection inlet can be formed large to the range allowable for the area of the cavity surface, resin in the shape of thin and large-diameter tablet, which is favorable for melting resin, can be used, resin is melted at a low pressure, the melting time is shortened and charging speed can be faster, and molten resin is injected into the cavity smoothly. Because resin can be charge data low pressure, resin is molded by clamping the top mold and the bottom mold with a low pressure.

Because the resin-sealing apparatus can be structured so that molten resin is injected from the center of the cavity surface, the injected resin flows from the center to the periphery, and air in the cavity is moved from the center toward periphery evenly, as the result even resin seal is formed and void forming is prevented. Furthermore, because the pot has an opening at the center, this structure is favorable for wire interval, air vent direction, and resin charging time shortening. Furthermore, because less air is trapped, resin is charged and molded at a low pressure, and adhered resin tailing on a molded product is eliminated. A small air vent may be formed on a mold unit.

Furthermore, because the resin-sealing apparatus is structured so that molten resin is pushed out by a plunger, the pushing pressure and pushing speed of the plunger can be controlled as desired depending on the volume of the cavity, size of the target product to be sealed, and type of sealing resin.

Furthermore, because a mold unit is provided with a plurality of cavities, pots, and plungers, a plurality of resin seals can be formed simultaneously.

As described hereinabove, according to the present invention, a resin-sealing apparatus that can be operated with a low pressure and with a low clamping force is obtained, and the durability of a mold unit is improved. A small-sized, simple, and low cost resin-sealing apparatus is realized, and the maintenance frequency is reduced, furthermore the efficiency of resin molding work is improved, as the result many excellent effects are obtained.

What is claimed is:

1. A resin-sealing apparatus comprising:

a pair of a top mold and a bottom mold one of which is movable;

heaters disposed on the top mold and under the bottom mold respectively; and a cavity formed between the pair of the top mold and the bottom mold, wherein:

the resin-sealing apparatus is provided with:

a pot having a resin injection inlet that opens directly to the cavity of the bottom mold that supplies at least one of resin tablets and powder resin and for melting the same by the heaters to form molten resin; and a plunger for injecting molten resin in the pot into the cavity from the opposite side to the resin injection inlet side of the pot, and the plunger is disposed slidably in the pot and airtightly with the inside wall of the pot.

2. The resin-sealing apparatus as claimed in claim 1, wherein a plurality of cavities are formed on the mold unit, and a pair of a pot and a plunger are provided for each cavity so that a resin injection inlet opens to the cavity.

3. The resin-sealing apparatus as claimed in claim 2, wherein the size of the plurality of cavities is different from each other depending on the size of target products to be molded.

4. The resin-sealing apparatus as claimed in claim 1 or claim 2, wherein the resin injection inlet of the pot opens directly to the inside surface center of the cavity of the mold unit.

5. The resin-sealing apparatus as claimed in claim 1 or claim 2, wherein the resin-sealing apparatus is provided with a pushing speed controller for controlling the pushing speed of the plunger for injecting molten resin into the cavity.

* * * * *